July 23, 1929.  J. M. LANE  1,722,150
INSECT CATCHER
Filed Nov. 11, 1927
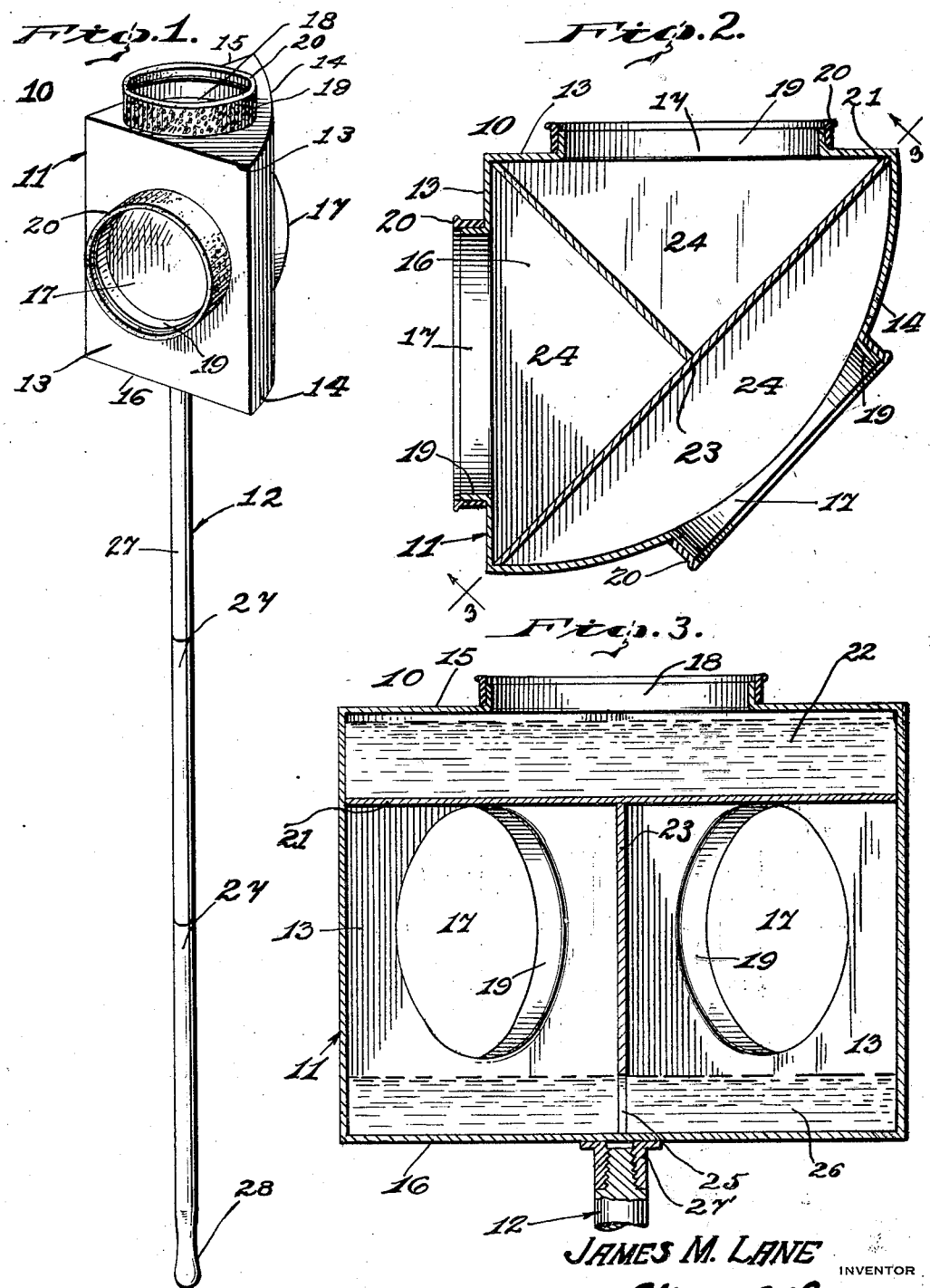
JAMES M. LANE, INVENTOR
BY *Victor J. Evans*
ATTORNEY
WITNESS:

Patented July 23, 1929.

1,722,150

UNITED STATES PATENT OFFICE.

JAMES M. LANE, OF LONG BRANCH, NEW JERSEY.

INSECT CATCHER.

Application filed November 11, 1927. Serial No. 232,671.

This invention relates to improvements in insect catchers and has particular reference to a device for catching and exterminating such pests as flies, mosquitoes and spiders which frequently find their way into a dwelling.

The primary object of the invention resides in a device by which an insect may be trapped when resting upon a wall or ceiling of a room by placing the device over the spot where it may be, which causes the insect to fly into the device when making an attempt to escape, and in which a supply of insecticide is kept, the fumes from which are sufficient to instantly overcome and kill the pest.

Another object of the invention is to provide an insect catcher which may catch and kill an insect when resting upon a wall or ceiling without soiling the wall or ceiling.

A further object of the invention is to provide an insect catcher which includes a box-like container having three side walls and which may be applied to the corners of a wall or ceiling to capture any insect present thereon.

A still further object is to provide an insect catcher which is simple in construction, inexpensive of manufacture and easy to operate.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved insect catcher.

Figure 2 is a horizontal sectional view therethrough.

Figure 3 is a vertical sectional view on the line 3—3 of Figure 2.

Referring more particularly to the drawing, the reference 10 designates my improved insect catcher in its entirety which includes a box-like container 11 and a handle member or staff 12.

The container 11 is of segmental shape in plan and comprises two right angularly disposed side walls 13, 13, and a curved or outwardly bowed wall 14, the curvature of the wall 14 being on an arc of a radius at the joinder of the two angular walls 13, 13. A top wall 15 spans the side walls and a bottom wall 16 is disposed opposite the top wall. Each of the side walls is provided with an opening 17 at a diameter sufficiently large enough to take up the major portion of the area of the walls, while a similar opening 18 is provided in the top wall 15. Each opening is bounded on the exterior of the walls by a flange 19 having a yieldable ring 20 on the peripheral edge thereof for preventing marring of a wall or ceiling when the device is pressed thereagainst.

The interior of the container 11 is divided by a horizontal partition 21 disposed above the top of the openings 17 in the side walls to provide an upper chamber 22 which is adapted to contain a supply of insecticide such as kerosene or the like. A vertical T-shaped partition 23 extends from the bottom wall 16 to the horizontal partition 21 for dividing the container below the partition into three separate chambers 24, all of which open to the atmosphere through the openings 17 in the side walls. The bottoms of the partition 23 are provided with openings 25 for establishing communication between the several chambers 24 for allowing an equal amount of kerosene or insecticide 26 to be contained therein upon the filling of the compartments 24 through any one of the openings 17. The level of the kerosene is disposed above the top of the openings 25 to seal the same so that the chambers are closed against the possibility of an insect entering one of the chambers and escaping through another chamber.

The handle or staff 12 comprises a plurality of separable sections 27 which are detachably connected together to suit the desired length. It will be appreciated that in a low ceiling room, the length of the handle would be made shorter than if the ceilings were relatively high, whereupon a section of the staff may be removed. The top of the section of the handle threads into a socket 27' extending from the bottom wall 16 of the container, while the lowermost section is provided with a hand grip 28.

In practice, when it is desired to capture an insect which may be resting upon a wall of a room, the device is grasped by the hand grip and lifted to cause one of the flanges 19 to engage the wall over the spot where the insect may be. In an attempt to escape, the insect will enter one of the chambers 24 and in so doing, the fumes from the kerosene or other insecticide will instantly overcome the insect and he will drop into the insecticide which is deadly poison to insects of the kind mentioned. In the event that the insect is resting adjacent the corners of a room, the device is lifted to the spot so that the angular walls 13 are disposed parallel to the walls of the room. Should an insect be present upon the ceiling, the device is lifted to cause the insect to enter the opening 18 in the top wall where the fumes from the chamber 22 have the same effect as that just described.

When the container becomes filled with dead insects, the device may be emptied by pouring the insecticide through either of the openings 17 and the top opening 18.

What is claimed as new is:—

1. An insect catcher comprising a box-like container having openings in its side walls and top wall, a horizontal partition within said container disposed above the openings in the side walls for providing a chamber in the top of said container which opens to the atmosphere through the opening in the top wall, and a vertical partition between the bottom wall and the said horizontal partition for dividing the interior of the container into separate chambers having communication to the atmosphere through the respective openings in the side walls, all of the chambers adapted to contain a supply of insecticide.

2. An insect catcher comprising a box-like container having openings in its side walls and top wall, a horizontal partition within said container disposed above the openings in the side walls for providing a chamber in the top of said container which opens to the atmosphere through the opening in the top wall, a vertical partition between the bottom wall and the said horizontal partition for dividing the interior of the container into separate chambers having communication to the atmosphere through the respective openings in the side walls, all of the chambers adapted to contain a supply of insecticide, and flanges extending from the walls of said openings beyond the walls of said container.

3. An insect catcher comprising a box-like container having openings in its side walls and top wall, a horizontal partition within said container disposed above the openings in the side walls for providing a chamber in the top of said container which opens to the atmosphere through the opening in the top wall, a vertical partition between the bottom wall and the said horizontal partition for dividing the interior of the container into separate chambers having communication to the atmosphere through the respective openings in the side walls, all of the chambers adapted to contain a supply of insecticide, flanges extending from the walls of said openings beyond the walls of said container, and a staff extending from the bottom wall of said container by which the device may be lifted to a position against the wall or ceiling of a room.

4. An insect catcher comprising a box-like container having three side walls, a top wall, and a bottom wall, said top wall and side walls having openings therein, a horizontal partition within said container disposed above the openings in the side walls for providing a chamber at the top of said container, and a T-shaped vertical partition between said partition and said bottom wall to provide the interior of said container into three separate chambers, access to which is had through the respective openings in the side walls.

5. An insect catcher comprising a box-like container having three side walls, a top wall, and a bottom wall, said top wall and side walls having openings therein, a horizontal partition within said container disposed above the openings in the side walls for providing a chamber at the top of said container, and a T-shaped vertical partition between said partition and said bottom wall to provide the interior of said container into three separate chambers, access to which is had through the respective openings in the side walls, said partitions having openings at the bottom thereof below the openings in the side walls.

6. An insect catcher comprising a box-like container of segmental shape in plan to provide a pair of angularly disposed side walls and a curved side wall, all the side walls being provided with openings, and a vertical partition within said container for dividing the interior of the same into separate chambers, access to which is had through openings in the respective side walls.

7. An insect catcher comprising a box-like body having angularly disposed top and side walls, a bottom wall having a handle thereon, outwardly projecting flanges surrounding openings in said walls, yieldable cushions extending beyond the outer edge of said flanges, a horizontal partition within the body above the openings in said side walls and forming a compartment below the opening in said top wall and a compartment below said partition, and transverse partitions also within said body subdividing said last mentioned compartment, thereby forming separate compartments into which the respective openings of said side walls lead.

8. An insect catcher comprising a body having practically triangular, parallel top and bottom walls, angularly disposed lateral surfaces connecting said walls, an outwardly projecting flange surrounding an opening in said top wall, an outwardly projecting flange surrounding an opening in one of said surfaces, a horizontal partition within said body forming separate compartments into which the respective openings lead, said compartments adapted to carry an insecticide, and a manipulating staff attached to said bottom wall and having separable sections for varying the length of said staff.

In testimony whereof I have affixed my signature.

JAMES M. LANE.